(12) United States Patent
Zheng et al.

(10) Patent No.: US 12,529,688 B2
(45) Date of Patent: Jan. 20, 2026

(54) METHOD FOR DISCRIMINATING DEPOSIT TYPES BASED ON TOURMALINE COMPONENTS

(71) Applicant: CHINA UNIVERSITY OF GEOSCIENCES (BEIJING), Beijing (CN)

(72) Inventors: Youye Zheng, Beijing (CN); Peng Liu, Beijing (CN); Qiong Ci, Lhasa (CN); Xiaofang Dou, Beijing (CN); Song Wu, Beijing (CN); Xiaofeng Liu, Lhasa (CN); Fuzhi Gong, Lhasa (CN)

(73) Assignee: CHINA UNIVERSITY OF GEOSCIENCES (BEIJING), Beijing (CN)

( * ) Notice: Subject to any disclaimer, the term of this patent is extended or adjusted under 35 U.S.C. 154(b) by 159 days.

(21) Appl. No.: 18/504,186

(22) Filed: Nov. 8, 2023

(65) Prior Publication Data

US 2025/0012775 A1    Jan. 9, 2025

(30) Foreign Application Priority Data

Jul. 6, 2023  (CN) .......................... 202310824618.9

(51) Int. Cl.
 *G01N 33/24*  (2006.01)
(52) U.S. Cl.
 CPC ................... *G01N 33/24* (2013.01)
(58) Field of Classification Search
 CPC ..................................................... G01N 33/24
 See application file for complete search history.

(56) References Cited

U.S. PATENT DOCUMENTS

| 10,126,291 B2 | 11/2018 | Yu et al. |
| 10,690,613 B2 | 6/2020 | Yu et al. |
| 11,248,961 B2 | 2/2022 | Mcmanus et al. |

OTHER PUBLICATIONS

Peng Liu et al., "Geology and factors controlling the formation of the newly discovered Beimulang porphyry Cu deposit in the western Gangdese, southern Tibet"; Ore geoligy Review, journal homepage: www.elsevier.com/locate/oregeorev, pp. 1-23 (Year: 2022).*

(Continued)

*Primary Examiner* — Michael J Dalbo
*Assistant Examiner* — Kaleria Knox

(57) ABSTRACT

In a method for discriminating deposit types by using tourmaline elemental components, contents of Sn, Li, Ga, and V trace elements are determined by collecting hydrothermal tourmaline samples in a deposit, and deposit type discrimination is performed with F1, F2, and F3 as discriminant factors, in combination with the characteristics that a porphyry type Cu—Mo—Au deposit has lower contents of Sn+Li, and further, a porphyry type Cu—Mo deposit has higher contents of Ga*V, while a porphyry type Au deposit has relatively low contents of Ga*V; a granite-related Sn—W deposit has relatively high contents of Sn+Li; while an IOCG deposit has relatively high contents of Sn+Li and Ga*V, realizing quick discrimination of the deposit types during prospecting and exploration, shortening the exploration period and reducing the exploration cost, and the method can be used for identification of 4 different types of deposits.

4 Claims, 1 Drawing Sheet

(56) References Cited

OTHER PUBLICATIONS

"Complexly zoned fibrous tourmaline, Cruzeiro mine, Minas Gerais, Brazil: A record of evolving magmatic and hydrothermal fluids" Barbara L. Dutrows and Darrell J. Henry Department of Geology and Geophysics, Louisiana State University, Baton Rouge, Louisiana 70803, U.S.A, vol. 38, pp. 131-143 (2000) (Year: 2000).*
Darrell J. Henry, "Nomenclature of the tourmaline-supergroup minerals" American Mineralogist, vol. 96, pp. 895-913, 2011 (Year: 2011).*
Mariano Mercurio "The characterization of natural gemstones using non-invasive FT-IR spectroscopy: New data on tourmalines Author links open overlay panel" vol. 178, Feb. 1, 2018, pp. 147-159 (Year: 2018).*
Mengxu Guo "Tourmaline as an indicator of ore-forming processes: Evidence from the Laodou gold deposit, Northwest China" Ore Geology Reviews 154 (2023) 105304, pp. 1-23 (Year: 2023).*

\* cited by examiner

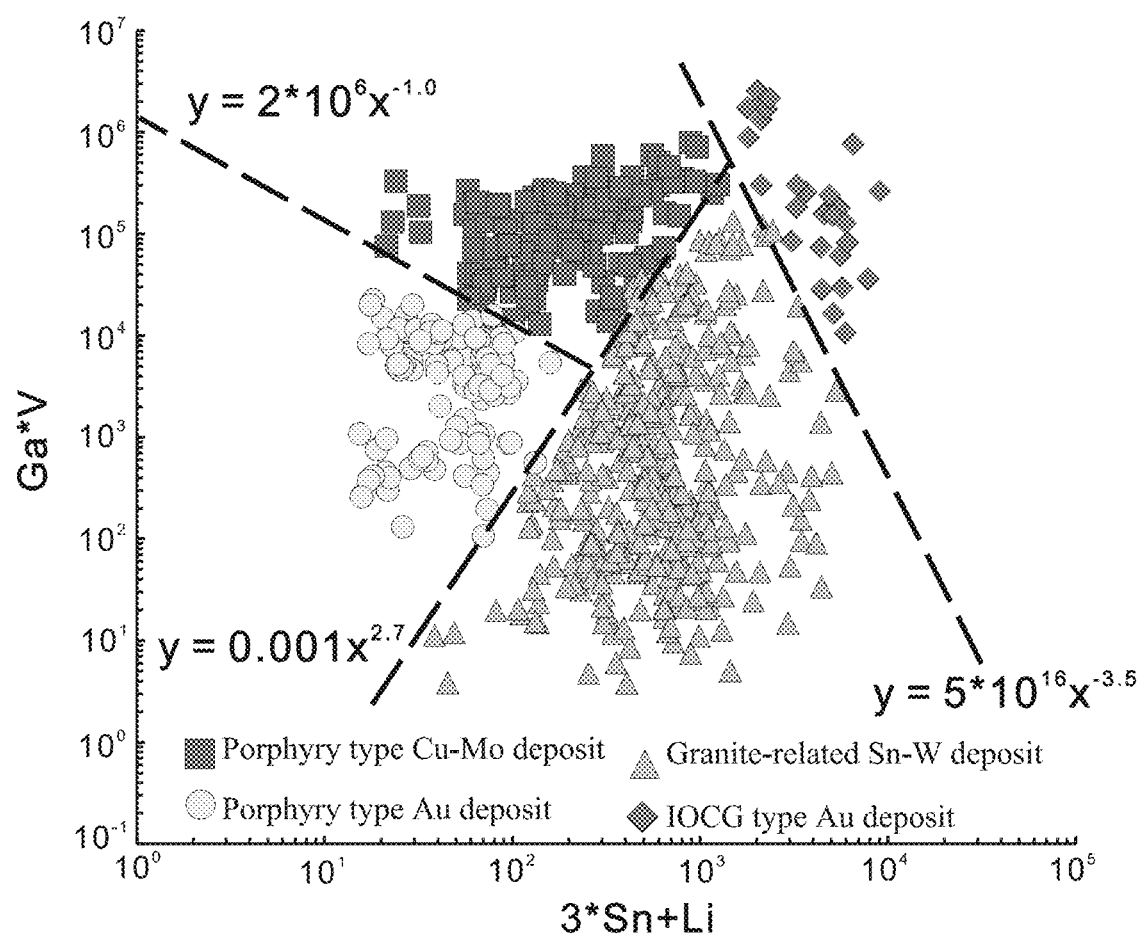

METHOD FOR DISCRIMINATING DEPOSIT TYPES BASED ON TOURMALINE COMPONENTS

CROSS-REFERENCE TO RELATED APPLICATIONS

This application claims priority to Chinese Patent Application No. 202310824618.9 with a filing date of Feb. 23, 2023. The content of the aforementioned application, including any intervening amendments thereto, is incorporated herein by reference.

TECHNICAL FIELD

The present invention belongs to the field of deposit exploration and evaluation, and in particular relates to a method for discriminating deposit types by using tourmaline components.

BACKGROUND

Porphyry deposits refer to fine-mesh veined and disseminated ore bodies widely distributed in and around porphyry-like rocks. The porphyry deposit plays an extremely important role in the world's deposit types, and currently porphyry copper deposits supply nearly 75% of copper, 50% of molybdenum and 20% of gold in the world. The porphyry deposits in China include porphyry-type Cu (—Mo, —Au), porphyry-type Mo, porphyry-type Au, and porphyry-type Pb—Zn. Sn and W are important strategic minerals in China, and granite-related Sn—W deposits are the main source of Sn and W. Iron oxide-copper-gold (IOCG) deposits are an important deposit type proposed in recent 20 years. This type of deposit has large reserves, contains a large amount of low-Ti-content iron oxides, and is accompanied by Cu and Au with great economic values, and enriches metals such as REE, U, P and Co to varying degrees, and thus the IOCG deposit has significant scientific research values and exploration significance.

Currently, traditional determination of deposit types primarily relies on geochemical survey of rock, large-scale lithology-alteration-mineralization mapping, borehole verification, etc. However, these methods require a large amount of manpower and money, have a long period, and high costs, and cannot meet the urgent need for rapid exploration and evaluation.

Therefore, there is a need to find an accurate, economical, and efficient method to discriminate deposit types.

SUMMARY OF PRESENT INVENTION

An object of the present invention is to provide a method for quickly discriminating deposit types by using tourmaline components, which realizes quick discrimination of the deposit types during prospecting and exploration, shortens the exploration period, and reduces the exploration cost, and the method can be used for identification of 4 different types of deposits, and is a new method for prospecting that is economical, efficient, and green.

In order to achieve the above object, the present invention adopts the following technical solutions:

provided is a method for quickly discriminating deposit types by using tourmaline components, including the steps of:

1) sample collection identifying tourmaline in a deposit, distinguishing magmatic tourmaline from hydrothermal tourmaline, and collecting hydrothermal tourmaline samples;

2) sample preparation and analysis preparing the hydrothermal tourmaline samples collected in the step 1) into probe sheets, and performing in-situ micro-area elemental analysis and data processing to obtain contents of Sn, Li, Ga, and V trace elements in the hydrothermal tourmaline, denoted as $c(Sn)$, $c(Li)$, $c(Ga)$, and $c(V)$; and 3) performing deposit type discrimination with F1, F2, and F3 as discriminant factors, specifically:

$$F1 = 0.001 * (3 * c(Sn) + c(Li))^{2.7} \quad \text{(Formula 1)}$$

$$F2 = 5 * 10^{16} * (3 * c(Sn) + c(Li))^{-3.5} \quad \text{(Formula 2)}$$

$$F3 = 2 * 10^{6} * (3 * c(Sn)c(Li))^{-1.0}; \quad \text{(Formula 3)}$$

substituting the Sn content and the Li content into the formula 1, the formula 2 and the formula 3 to calculate the discriminant factors F1, F2 and F3, respectively, wherein:

when $c(Ga)*c(V)<F1$ and $c(Ga)*c(V)<F2$, discriminating the deposit as granite-related Sn—W;

when $c(Ga)*c(V)>F2$, discriminating the deposit as IOCG type Au;

when $F1<c(Ga)*c(V)<F3$, discriminating the deposit as porphyry type Au; and when $c(Ga)*c(V)>F1$, $c(Ga)*c(V)>F3$ and $c(Ga)*c(V)<F2$, discriminating the deposit as porphyry type Cu—Mo;

wherein specific steps of obtaining the discriminant factors F1, F2, and F3 are as follows:

① sample collection identifying tourmaline in a porphyry type Cu—Mo deposit, a porphyry type Au deposit, a granite-related Sn—W deposit and an IOCG type Au deposit, respectively, distinguishing magmatic tourmaline from hydrothermal tourmaline, and collecting hydrothermal tourmaline samples of different deposits;

② sample preparation and analysis preparing the hydrothermal tourmaline samples collected in the step (1) into probe sheets, and performing in-situ micro-area elemental analysis and data processing to obtain contents of Sn, Li, Ga, and V trace elements in the hydrothermal tourmaline, denoted as $c(Sn)$, $c(Li)$, $c(Ga)$, and $c(V)$; and ③ obtaining the discriminant factors F1, F2, and F3 performing diagram projection with $3*c(Sn)+c(Li)$ as an abscissa and $c(Ga)*c(V)$ as an ordinate to obtain boundaries of different deposit types according to a diagram projection range, and obtaining the discriminant factors F1-F3, wherein:

$$F1 = 0.001 * (3 * c(Sn) + c(Li))^{2.7} \quad \text{(Formula 1)}$$

$$F2 = 5 * 10^{16} * (3 * c(Sn) + c(Li))^{-3.5} \quad \text{(Formula 2)}$$

$$F3 = 2 * 10^{6} * (3 * c(Sn)c(Li))^{-1.0}; \quad \text{(Formula 3)}$$

According to the above solution, in the step 1), a criterion for distinguishing the magmatic tourmaline from the hydrothermal tourmaline is as follows: the magmatic tourmaline is produced in a disseminated form in a weakly altered rock mass while the hydrothermal tourmaline is produced in a veined form or formed in strongly altered rock.

According to the above solution, in the step 2), the in-situ micro-area elemental analysis by laser ablation inductively coupled plasma mass spectrometry is performed on the tourmaline samples, and analytical elements include Li, Be, Sc, Ti, V, Cr, Mn, Co, Ni, Cu, Zn, Ga, Rb, Sr, Y, Zr, Nb, Sn, Sb, B, Ba, La, Ce, Pr, Nd, Sm, Eu, Gd, Tb, Dy, Ho, Er, Tm, Yb, Lu, Hf, Ta, Pb, Th, and U.

According to the above solution, in the step 2), analytical data is processed by using ICPMSDataCal software to obtain data in an Excel format file.

Preferably, there may be mistake data existing in the analytical data, and the analytical data is processed by rejecting the mistaken data according to the following criteria: when a content of B element c(B)>10000 ppm which indicates that a test location on the sample is wrong or the probe sheet is penetrated, rejecting the mistaken data; and when a content of Ba element c(Ba)<0.6 ppm which indicates that the probe sheet is the magmatic tourmaline, rejecting the mistaken data.

The principle of action of the method of the present invention is as follows:

tourmaline is a common accessory mineral, and can be formed in different types of deposits, such as a porphyry type Cu—Mo—Au deposit, a granite-related Sn—W deposit, and an IOCG type Au deposit. Whether or not tourmaline trace element changes can be used to indicate different deposit types based on the response of tourmaline trace element changes to factors such as ore-forming fluid components, surrounding rock characteristics, temperature, and pH, which are closely related to different deposit types. Based on the above principle and idea, in the present invention, on the basis of a large amount of hydrothermal tourmaline data, through systematic analysis and comparison, it is found that the porphyry type Cu—Mo—Au deposit has lower contents of Sn+Li, and further, the porphyry type Cu—Mo deposit has higher contents of Ga*V, while the porphyry type Au deposit has relatively low contents of Ga*V; the granite-related Sn—W deposit has relatively high contents of Sn+Li; while the IOCG deposit has relatively high contents of Sn+Li and Ga*V. On the basis of the above laws, a formula for quantitatively discriminating different deposit types is further fitted, and quick discrimination of the deposit types during prospecting and exploration is achieved, the exploration period is shortened, the exploration cost is reduced, and the method is a new method for prospecting that is economical, efficient, and green.

The beneficial effects of the present invention are as follows:

the present invention provides the method for discriminating the deposit types by using tourmaline trace element components. By utilizing an advanced in-situ analytical technique, tourmaline, a common mineral in a hydrothermal deposit, is upgraded from a qualitative description to a quantitative explanation, changes of its trace elements are linked with different deposit types, and the deposit type can be quickly discriminated by tourmaline components in one newly discovered deposit, further guiding the direction of prospecting and exploration, and effectively shortening the deposit exploration period; and the method can identify 4 different types of deposits, and is economical and efficient, and has broad prospects for promotion.

BRIEF DESCRIPTION OF THE DRAWINGS

FIG. 1 is a diagram of differentiation of deposit types by using tourmaline components according to an embodiment of the present invention.

DETAILED DESCRIPTION OF THE EMBODIMENTS

In order to make the objects, technical solutions and advantages of the present invention more clear, the present invention will be further described in detail with reference to the accompanying drawings and embodiments. It should be understood that the specific embodiments described herein are merely illustrative of the present invention and are not intended to limit the present invention.

Embodiment 1

Specific steps of obtaining discriminant factors F1, F2, and F3 are as follows:

(1) Sample Collection

First, tourmalines are identified in a porphyry type Cu—Mo deposit, a porphyry type Au deposit, a granite-related Sn—W deposit and an IOCG type Au deposit, respectively. Secondly, magmatic tourmaline is distinguished from hydrothermal tourmaline, and specific manifestation features are as follows: the magmatic tourmaline is produced in a disseminated form in weakly altered rocks while the hydrothermal tourmaline is produced in a veined form or formed in strongly altered rocks. Finally, samples containing hydrothermal tourmaline are collected.

(2) Sample Preparation and Analysis

The samples containing tourmalines are prepared into probe sheets, and tourmalines are identified under a microscope, and are marked by using a marker pen. Tourmalines with a well-developed crystal form and larger particles satisfying the analytical conditions are selected for in-situ micro-area elemental analysis by laser ablation inductively coupled plasma mass spectrometry. Analytical elements include Li, Be, Sc, Ti, V, Cr, Mn, Co, Ni, Cu, Zn, Ga, Rb, Sr, Y, Zr, Nb, Sn, Sb, B, Ba, La, Ce, Pr, Nd, Sm, Eu, Gd, Tb, Dy, Ho, Er, Tm, Yb, Lu, Hf, Ta, Pb, Th, and U.

(3) Data Processing and Interpretation

The analytical data is processed by using ICPMSDataCal software to obtain data in an Excel format file. Further, it is possible to perform mistaken penetration or detect magmatic tourmaline during analysis, and the analytical data is rejected by using the following criteria: when B>10000 ppm, mistaken penetration or penetration data is rejected; and when Ba<0.6 ppm, the magmatic tourmaline is rejected, finally obtaining trace element data of tourmaline.

(4) Obtaining Formulas for Calculating the Discriminant Factors F1, F2 and F3

The data obtained in the step (3) is processed by using Excel. Analysis of Sn, Li, Ga, and V trace elements in the turmaline is performed. The contents of the trace elements Sn, Li, Ga, and V in the turmaline are defined as c(Sn), c(Li), c(Ga), and c(V).

Diagram projection is performed with 3*c(Sn)+c(Li) as an abscissa and c(Ga)*c(V) as an ordinate, as shown in FIG. 1, boundaries of different deposit types are obtained according to a diagram projection range, and the discriminant factors F1-F3 are calculated by using the following formulae; wherein:

$$F1 = 0.001 * (3 * c(Sn) + c(Li))^{2.7}; \quad \text{(Formula 1)}$$

$$F2 = 5 * 10^{16} * (3 * c(Sn) + c(Li))^{-3.5}; \text{ and} \quad \text{(Formula 2)}$$

$$F3 = 2 * 10^6 * (3 * c(Sn)c(Li))^{-1.0}. \quad \text{(Formula 3)}$$

(5) Deposit Type Discrimination Method

The contents of Sn, Li, Ga, and V trace elements in the hydrothermal tourmaline to be analyzed are obtained according to the method in the steps (1) and (2), denoted as c(Sn), c(Li), c(Ga), and c(V); and the Sn content and the Li content are substituted into the formula 1, the formula 2 and the formula 3 to calculate the discriminant factors F1, F2 and F3, respectively; wherein:

when c(Ga)*c(V)<F1 and c(Ga)*c(V)<F2, the deposit is discriminated as granite-related Sn—W;

when c(Ga)*c(V)>F2, the deposit is discriminated as IOCG type Au;

when F1<c(Ga)*c(V)<F3, the deposit is discriminated as porphyry type Au; and when c(Ga)*c(V)>F1, c(Ga)*c(V)>F3 and c(Ga)*c(V)<F2, the deposit is discriminated as porphyry type Cu—Mo.

Embodiment 2

Discrimination of a deposit type by using tourmaline components: taking a porphyry Cu—Mo deposit in Beimulang, Tibet as an example, the specific steps are as follows:
a. sample collection: samples containing hydrothermal tourmaline are collected on the surface and in the boreholes of Beimulang according to a production state of the tourmaline.
b. Sample processing: the collected samples are ground into probe sheets, and tourmaline minerals are circled under a microscope.
c. Sample analysis: trace elements in the turmaline are analyzed by using a laser ablation inductively coupled plasma mass spectrometer for analysis of the trace elements in the turmaline to obtain contents of Li, Be, Sc, Ti, V, Cr, Mn, Co, Ni, Cu, Zn, Ga, Rb, Sr, Y, Zr, Nb, Sn, Sb, B, Ba, La, Ce, Pr, Nd, Sm, Eu, Gd, Tb, Dy, Ho, Er, Tm, Yb, Lu, Hf, Ta, Pb, Th, and U.
d. Data processing: data analysis and processing are performed by using ICPMSDataCal software.
e. Distinguishing deposit types: final data processed by using Excel is shown in Table 1, discriminant factors F1, F2 and F3 are calculated according to the formulae 1-3 in Embodiment 1, based on the calculation results of the discriminant factors F1, F2 and F3 in combination with the discrimination method in the step (5) of Embodiment 1, it is discriminated that Beimulang tourmaline collected this time belongs to a porphyry type Cu—Mo deposit, which is consistent with geological facts, further proving the effectiveness of the new method for discriminating the deposit type based on tourmaline components proposed this time.

TABLE 1

Data results for some trace elements in turmaline of Beimulang deposit, Tibet

| Deposit type | Deposit name | V (ppm) | Ga (ppm) | Li (ppm) | Sn (ppm) |
|---|---|---|---|---|---|
| Porphyry type Cu—Mo | Beimulang | 1401.58 | 194.06 | — | 420.61 |
| Porphyry type Cu—Mo | Beimulang | 4182.79 | 188.87 | 53.01 | 726.20 |
| Porphyry type Cu—Mo | Beimulang | 1949.12 | 175.60 | 39.39 | 183.94 |
| Porphyry type Cu—Mo | Beimulang | 1708.08 | 111.57 | 50.75 | 233.67 |
| Porphyry type Cu—Mo | Beimulang | 1510.76 | 160.48 | 35.28 | 131.86 |
| Porphyry type Cu—Mo | Beimulang | 1673.10 | 137.58 | 32.20 | 35.59 |
| Porphyry type Cu—Mo | Beimulang | 1700.75 | 211.96 | 32.52 | 142.88 |
| Porphyry type Cu—Mo | Beimulang | 1327.40 | 149.76 | 35.78 | 75.01 |
| Porphyry type Cu—Mo | Beimulang | 1467.25 | 109.07 | — | 645.89 |
| Porphyry type Cu—Mo | Beimulang | 1779.96 | 120.26 | 32.93 | 113.97 |
| Porphyry type Cu—Mo | Beimulang | 2036.09 | 118.21 | — | 208.48 |
| Porphyry type Cu—Mo | Beimulang | 2238.58 | 162.18 | 43.67 | 149.16 |
| Porphyry type Cu—Mo | Beimulang | 1615.84 | 222.85 | 24.47 | 359.16 |
| Porphyry type Cu—Mo | Beimulang | 785.96 | 221.43 | — | 129.10 |
| Porphyry type Cu—Mo | Beimulang | 917.76 | 287.39 | — | 371.59 |
| Porphyry type Cu—Mo | Beimulang | 1567.90 | 224.05 | — | 805.98 |
| Porphyry type Cu—Mo | Beimulang | 1196.32 | 250.21 | — | 594.07 |
| Porphyry type Cu—Mo | Beimulang | 741.21 | 204.02 | — | 772.00 |
| Porphyry type Cu—Mo | Beimulang | 1169.51 | 226.34 | — | 552.31 |
| Porphyry type Cu—Mo | Beimulang | 2915.34 | 205.16 | — | 554.16 |
| Porphyry type Cu—Mo | Beimulang | 975.29 | 192.36 | 81.76 | 38.72 |
| Porphyry type Cu—Mo | Beimulang | 515.03 | 189.75 | 58.91 | 20.65 |
| Porphyry type Cu—Mo | Beimulang | 407.48 | 139.25 | 71.10 | 20.68 |
| Porphyry type Cu—Mo | Beimulang | 607.44 | 153.91 | 38.03 | 36.32 |
| Porphyry type Cu—Mo | Beimulang | 192.77 | 107.08 | 114.43 | 9.66 |
| Porphyry type Cu—Mo | Beimulang | 409.44 | 116.55 | 37.58 | 23.84 |
| Porphyry type Cu—Mo | Beimulang | 1073.25 | 142.39 | — | 154.05 |
| Porphyry type Cu—Mo | Beimulang | 1130.19 | 123.29 | — | 136.20 |
| Porphyry type Cu—Mo | Beimulang | 1050.69 | 156.48 | — | 429.53 |
| Porphyry type Cu—Mo | Beimulang | 1176.77 | 132.47 | — | 320.84 |
| Porphyry type Cu—Mo | Beimulang | 501.57 | 97.47 | 22.56 | 377.78 |
| Porphyry type Cu—Mo | Beimulang | 356.96 | 64.35 | 17.57 | 77.60 |

TABLE 1-continued

Data results for some trace elements in turmaline of Beimulang deposit, Tibet

| Deposit type | Deposit name | V (ppm) | Ga (ppm) | Li (ppm) | Sn (ppm) |
|---|---|---|---|---|---|
| Porphyry type Cu—Mo | Beimulang | 1556.49 | 147.77 | 23.29 | 60.68 |
| Porphyry type Cu—Mo | Beimulang | 1027.60 | 133.17 | 22.50 | 30.23 |
| Porphyry type Cu—Mo | Beimulang | 1047.46 | 127.40 | 35.72 | 90.38 |
| Porphyry type Cu—Mo | Beimulang | 1197.98 | 143.66 | — | 250.19 |
| Porphyry type Cu—Mo | Beimulang | 1375.58 | 152.97 | — | 347.68 |
| Porphyry type Cu—Mo | Beimulang | 1330.10 | 146.76 | — | 84.89 |
| Porphyry type Cu—Mo | Beimulang | 1515.66 | 156.96 | 106.29 | 156.95 |
| Porphyry type Cu—Mo | Beimulang | 633.05 | 82.50 | — | 83.05 |
| Porphyry type Cu—Mo | Beimulang | 359.70 | 82.89 | 48.74 | 301.37 |
| Porphyry type Cu—Mo | Beimulang | 642.48 | 79.31 | 81.20 | 127.77 |
| Porphyry type Cu—Mo | Beimulang | 660.96 | 77.28 | 35.40 | 166.09 |
| Porphyry type Cu—Mo | Beimulang | 671.96 | 76.98 | 110.40 | 163.38 |
| Porphyry type Cu—Mo | Beimulang | 483.39 | 68.99 | 49.54 | 155.38 |
| Porphyry type Cu—Mo | Beimulang | 658.22 | 90.74 | 102.00 | 296.51 |
| Porphyry type Cu—Mo | Beimulang | 607.11 | 96.75 | 76.96 | 282.18 |
| Porphyry type Cu—Mo | Beimulang | 506.95 | 79.73 | — | 130.24 |
| Porphyry type Cu—Mo | Beimulang | 1250.57 | 106.21 | 62.25 | 237.59 |
| Porphyry type Cu—Mo | Beimulang | 2661.23 | 122.24 | 127.70 | 335.30 |
| Porphyry type Cu—Mo | Beimulang | 2933.81 | 171.99 | 95.73 | 310.26 |
| Porphyry type Cu—Mo | Beimulang | 2806.55 | 162.40 | 48.32 | 533.05 |
| Porphyry type Cu—Mo | Beimulang | 1854.12 | 107.36 | 62.69 | 143.63 |
| Porphyry type Cu—Mo | Beimulang | 567.20 | 150.99 | 41.91 | 134.15 |
| Porphyry type Cu—Mo | Beimulang | 371.94 | 63.97 | — | 335.05 |
| Porphyry type Cu—Mo | Beimulang | 465.83 | 104.67 | 43.44 | 140.89 |
| Porphyry type Cu—Mo | Beimulang | 778.61 | 93.55 | 54.87 | 475.16 |
| Porphyry type Cu—Mo | Beimulang | 1009.28 | 239.54 | 30.87 | 52.84 |
| Porphyry type Cu—Mo | Beimulang | 983.24 | 272.42 | — | 57.50 |
| Porphyry type Cu—Mo | Beimulang | 898.73 | 218.00 | — | 62.89 |
| Porphyry type Cu—Mo | Beimulang | 860.15 | 180.32 | — | 55.64 |
| Porphyry type Cu—Mo | Beimulang | 946.34 | 212.18 | 29.39 | 65.43 |
| Porphyry type Cu—Mo | Beimulang | 452 | 108 | 32.1 | 324 |
| Porphyry type Cu—Mo | Beimulang | 891 | 144 | 17.1 | 262 |
| Porphyry type Cu—Mo | Beimulang | 838 | 152 | 11.8 | 94.7 |
| Porphyry type Cu—Mo | Beimulang | 699 | 149 | 27.1 | 156 |
| Porphyry type Cu—Mo | Beimulang | 607 | 166 | 21.3 | 234 |
| Porphyry type Cu—Mo | Beimulang | 399 | 82.9 | 9.78 | 30.8 |
| Porphyry type Cu—Mo | Beimulang | 466 | 88.2 | 9.83 | 28.8 |
| Porphyry type Cu—Mo | Beimulang | 399 | 78.6 | 13.2 | 30.4 |
| Porphyry type Cu—Mo | Beimulang | 330 | 72.4 | 14.2 | 22.2 |
| Porphyry type Cu—Mo | Beimulang | 547 | 95.5 | 8.87 | 53.0 |
| Porphyry type Cu—Mo | Beimulang | 1020 | 106 | 17.3 | 10.5 |
| Porphyry type Cu—Mo | Beimulang | 1101 | 121 | 16.4 | 24.2 |
| Porphyry type Cu—Mo | Beimulang | 592 | 119 | 15.1 | 16.7 |
| Porphyry type Cu—Mo | Beimulang | 487 | 82.3 | 17.0 | 13.4 |
| Porphyry type Cu—Mo | Beimulang | 243 | 98.9 | 19.6 | 10.8 |
| Porphyry type Cu—Mo | Beimulang | 413 | 69.4 | 22.4 | 4.10 |
| Porphyry type Cu—Mo | Beimulang | 346 | 140 | 22.4 | 56.3 |
| Porphyry type Cu—Mo | Beimulang | 385 | 70.1 | 18.2 | 44.2 |
| Porphyry type Cu—Mo | Beimulang | 447 | 85.8 | 20.2 | 44.9 |
| Porphyry type Cu—Mo | Beimulang | 443 | 149 | 19.5 | 197 |
| Porphyry type Cu—Mo | Beimulang | 439 | 80.9 | 26.7 | 54.2 |
| Porphyry type Cu—Mo | Beimulang | 548 | 73.6 | 17.1 | 17.1 |
| Porphyry type Cu—Mo | Beimulang | 447 | 76.3 | 20.0 | 12.0 |
| Porphyry type Cu—Mo | Beimulang | 406 | 77.2 | 18.9 | 13.5 |
| Porphyry type Cu—Mo | Beimulang | 360 | 111 | 19.8 | 69.6 |
| Porphyry type Cu—Mo | Beimulang | 526 | 73.3 | 22.4 | 20.9 |
| Porphyry type Cu—Mo | Beimulang | 402 | 136 | 13.6 | 91.2 |
| Porphyry type Cu—Mo | Beimulang | 553 | 139 | 22.6 | 59.7 |
| Porphyry type Cu—Mo | Beimulang | 624 | 136 | 10.3 | 174 |
| Porphyry type Cu—Mo | Beimulang | 817 | 127 | 17.4 | 354 |
| Porphyry type Cu—Mo | Beimulang | 880 | 67.2 | 24.4 | 6.33 |
| Porphyry type Cu—Mo | Beimulang | 850 | 128 | 14.9 | 46.5 |
| Porphyry type Cu—Mo | Beimulang | 663 | 98.8 | 34.7 | 10.3 |
| Porphyry type Cu—Mo | Beimulang | 1071 | 191 | 10.7 | 32.7 |
| Porphyry type Cu—Mo | Beimulang | 898 | 82.1 | 9.43 | 160 |
| Porphyry type Cu—Mo | Beimulang | 604 | 86.1 | 19.7 | 87.2 |
| Porphyry type Cu—Mo | Beimulang | 627 | 123 | 20.7 | 34.1 |
| Porphyry type Cu—Mo | Beimulang | 730 | 99.5 | 15.1 | 34.5 |
| Porphyry type Cu—Mo | Beimulang | 612 | 126 | 22.5 | 28.5 |
| Porphyry type Cu—Mo | Beimulang | 1063 | 195 | 15.0 | 73.5 |
| Porphyry type Cu—Mo | Beimulang | 1157 | 154 | 11.7 | 233 |
| Porphyry type Cu—Mo | Beimulang | 1286 | 145 | 12.8 | 147 |
| Porphyry type Cu—Mo | Beimulang | 1552 | 173 | 25.3 | 71.8 |
| Porphyry type Cu—Mo | Beimulang | 562 | 151 | 17.3 | 106 |

TABLE 1-continued

Data results for some trace elements in
turmaline of Beimulang deposit, Tibet

| Deposit type | Deposit name | V (ppm) | Ga (ppm) | Li (ppm) | Sn (ppm) |
|---|---|---|---|---|---|
| Porphyry type Cu—Mo | Beimulang | 451 | 177 | 30.8 | 107 |
| Porphyry type Cu—Mo | Beimulang | 507 | 128 | 8.66 | 198 |
| Porphyry type Cu—Mo | Beimulang | 1400 | 145 | 6.39 | 152 |
| Porphyry type Cu—Mo | Beimulang | 554 | 126 | 7.50 | 187 |
| Porphyry type Cu—Mo | Beimulang | 361 | 112 | 11.8 | 153 |
| Porphyry type Cu—Mo | Beimulang | 1386 | 182 | 22.6 | 99.3 |
| Porphyry type Cu—Mo | Beimulang | 2336 | 251 | 16.6 | 252 |
| Porphyry type Cu—Mo | Beimulang | 1431 | 152 | 9.61 | 288 |
| Porphyry type Cu—Mo | Beimulang | 1642 | 173 | 7.63 | 354 |
| Porphyry type Cu—Mo | Beimulang | 1340 | 142 | 16.3 | 34.5 |
| Porphyry type Cu—Mo | Beimulang | 264 | 86.1 | 15.2 | 13.2 |
| Porphyry type Cu—Mo | Beimulang | 471 | 71.3 | 22.9 | 49.1 |
| Porphyry type Cu—Mo | Beimulang | 381 | 78.2 | 15.1 | 72.5 |

It should be understood that for those of ordinary skill in the art, modifications and variations can be made according to the above descriptions, and all these modifications and variations should fall within the scope of protection of the appended claims.

What is claimed is:

1. A method for quickly discriminating deposit types by using tourmaline components, comprising:
   1) sample collection identifying tourmaline in a deposit, distinguishing magmatic tourmaline from hydrothermal tourmaline, and collecting hydrothermal tourmaline samples;
   2) sample preparation and analysis preparing the hydrothermal tourmaline samples collected in the step 1) into probe sheets, and performing in-situ micro-area elemental analysis and data processing to obtain contents of Sn, Li, Ga, and V trace elements in the hydrothermal tourmaline, denoted as c(Sn), c(Li), c(Ga), and c(V) respectively; and
   3) performing deposit type discrimination with F1, F2, and F3 as discriminant factors, specifically:

$$F1 = 0.001 * (3 * c(Sn) + c(Li))^{2.7} \quad \text{(Formula 1)}$$
$$F2 = 5 * 1016 * (3 * c(Sn) + c(Li))^{-3.5} \quad \text{(Formula 2)}$$
$$F3 = 2 * 10^{\circ} * (3 * c(Sn) + c(Li))^{-1.0}; \quad \text{(Formula 3)}$$

using an Excel spreadsheet software installed on a computer, to substitute Sn content and Li content into the formula 1, the formula 2 and the formula 3 to calculate the discriminant factors F1, F2 and F3 respectively, wherein:
   when c(Ga)*c(V) when c(Ga)*c(V)>F2, the computer discriminating the deposit as granite-related Sn—W;
   when c(Ga)*c(V)>F2, the computer discriminating the deposit of IOCG type Au;
   when F1<c(Ga)*c(V)<F3, the computer discriminating the deposit as porphyry type Au; and
   when c(Ga)*c(V)>F1, c(Ga)*c(V)>F3 and c(Ga)*c(V)<F2, the computer discriminating the deposit as porphyry type Cu—Mo;
   4) carrying out deposit exploration based on deposit type;
wherein the sample collection specifically comprises:
   identifying tourmaline in a porphyry type Cu-Mo deposit, a porphyry type Au deposit, a granite-related Sn—W deposit and an IOCG type Au deposit, respectively, distinguishing magmatic tourmaline from hydrothermal tourmaline, and collecting hydrothermal tourmaline samples of different deposits;
wherein the sample preparation and analysis specifically comprises:
   preparing the hydrothermal tourmaline samples collected in the step (1) into probe sheets, identifying tourmalines under a microscope, and marking the tourmalines by using a marker pen; selecting tourmalines with a well-developed crystal form and larger particles satisfying the analytical conditions for in-situ micro-area elemental analysis by laser ablation inductively coupled plasma mass spectrometry; performing data processing by using ICPMS-DataCal software installed on the computer to obtain data in an Excel format file; processing the data in the Excel format file by the Excel spreadsheet software installed on the computer to obtain contents of Sn, Li, Ga, and V trace elements in the hydrothermal tourmaline, denoted as c(Sn), c(L1), c(Ga), and c(V); and
wherein obtaining the discriminant factors F1, F2, and F3 specifically comprises:
   performing diagram projection with 3*c(Sn)+c(L1) as an abscissa and c(Ga)*c(V) as an ordinate to obtain boundaries of different deposit types according to a diagram projection range, and obtaining the discriminant factors F1-F3, wherein:

$$F1 = 0.001 * (3 * c(Sn) + c(Li))^{2.7} \quad \text{(Formula 1)}$$
$$F2 = 5 * 10^{16} * (3 * c(Sn) + c(Li))^{-3.5} \quad \text{(Formula 2)}$$
$$F3 = 2 * 10^6 * (3 * c(Sn) + c(Li))^{-1.0}. \quad \text{(Formula 3)}$$

2. The method according to claim 1, wherein in the step 1), a criterion for distinguishing the magmatic tourmaline from the hydrothermal tourmaline is as follows: the magmatic tourmaline is produced in a disseminated form in weakly altered rocks while the hydrothermal tourmaline is produced in a veined form or formed in strongly altered rocks.

3. The method according to claim 1, wherein in the step 2), the in-situ micro-area elemental analysis by laser ablation inductively coupled plasma mass spectrometry is performed on the tourmaline sample, and analytical elements comprise Li, Be, Sc, Ti, V, Cr, Mn, Co, Ni, Cu, Zn, Ga, Rb, Sr, Y, Zr, Nb, Sn, Sb, B, Ba, La, Ce, Pr, Nd, Sm, Eu, Gd, Tb, Dy, Ho, Er, Tm, Yb, Lu, Hf, Ta, Pb, Th, and U.

4. The method according to claim 3, wherein the analytical data is processed by rejecting mistaken data according to a criteria using the data processing software ICPMSDataCal installed on the computer: when a content of B element c(B)>10000 ppm, rejecting the mistaken data; and when a content of Ba element c(Ba)<0.6 ppm, rejecting the mistaken data.

* * * * *